(12) United States Patent
Dahm et al.

(10) Patent No.: US 6,301,471 B1
(45) Date of Patent: Oct. 9, 2001

(54) ONLINE CHURN REDUCTION AND LOYALTY SYSTEM

(75) Inventors: Cynthia N. Dahm, Palo Alto; Andrew L. Laursen, San Mateo, both of CA (US)

(73) Assignee: Openwave System Inc., Redwood City, CA (US)

( * ) Notice: Subject to any disclaimer, the term of this patent is extended or adjusted under 35 U.S.C. 154(b) by 0 days.

(21) Appl. No.: 09/184,209

(22) Filed: Nov. 2, 1998

(51) Int. Cl.⁷ .............................. H04Q 7/20; H04M 15/00
(52) U.S. Cl. .................... 455/405; 455/414; 455/418; 455/566; 379/114
(58) Field of Search .................... 455/405, 403, 455/406–408, 412, 414, 418–419, 566; 379/114

(56) References Cited

U.S. PATENT DOCUMENTS

| | | | |
|---|---|---|---|
| 5,027,388 | * 6/1991 | Bradshaw et al. | 379/114 |
| 5,084,819 | 1/1992 | Dewey et al. . | |
| 5,233,642 | * 8/1993 | Renton | 455/405 |
| 5,570,417 | * 10/1996 | Byers | 379/114 |
| 5,594,791 | 1/1997 | Owen et al. . | |
| 5,625,669 | * 4/1997 | McGregor et al. | 379/58 |
| 5,627,973 | 5/1997 | Armstrong et al. . | |
| 5,659,601 | * 8/1997 | Cheslog | 455/406 |
| 5,737,726 | 4/1998 | Cameron et al. . | |
| 5,765,138 | 6/1998 | Aycock et al. . | |
| 5,809,415 | * 9/1998 | Rossmann | 455/442 |
| 5,822,410 | 10/1998 | McCausland et al. . | |
| 5,832,457 | 11/1998 | O'Brien et al. . | |
| 5,885,087 | * 3/1999 | Thomas | 434/373 |
| 5,907,800 | * 5/1999 | Johnson et al. | 455/405 |
| 6,011,837 | * 1/2000 | Malik | 379/114 |
| 6,018,726 | * 1/2000 | Tsumura | 379/114 |
| 6,038,438 | * 3/2000 | Beeson et al. | 455/404 |

* cited by examiner

Primary Examiner—Lee Nguyen
Assistant Examiner—Simon Nguyen
(74) Attorney, Agent, or Firm—Joe Zheng; Alan D. Minsk

(57) ABSTRACT

A method and system are disclosed for providing subscriber loyalty and retention techniques These techniques are suitable for mobile devices with small screens and limited keypad communication. This system and method allows mobile subscribers who have been identified as being likely candidates for churning, to efficiently, visually and interactively, review an offer for a mobile service plan better meeting the subscriber's needs. The subscriber can review and execute the offer using the display and interface of a mobile device.

14 Claims, 11 Drawing Sheets

ONLINE CHURN REDUCTION AND LOYALTY SYSTEM

BACKGROUND OF THE INVENTION

1. Field of the Invention

The present invention relates to a wireless communication system and, more particularly, to a system for providing appropriate mobile services to subscribers.

2. Description of the Related Art

A successful mobile service provider has to be able to accomplish three tasks: 1) acquire new subscribers, 2) retain existing subscribers and 3) make a profit on the service provided. To this end, a mobile service provider typically develops several service plans and sends informational material on these service plans to retailers and subscribers. Many subscribers will purchase a service plan (from a retailer or directly from the service provider) based on a low base monthly rate and generally not based on their actual usage habits (e.g. number of domestic and international long distance calls). Satisfaction with an ill matched service plan usually lasts until the monthly phone bill comes and then the subscriber questions the suitability of the service plan. The level of dissatisfaction increases with each passing month (or bill) and the customer starts looking for a better deal. Unfortunately, this dissatisfaction is rarely expressed directly to the mobile service provider in any form other than a sudden discontinuation of the service.

One of the most pressing problems facing mobile service providers is churning. Churning refers to the situation where subscribers to mobile services discontinue service with one service provider to sign with another source provider or discontinue their service all together. The churn rate for the wireless industry averages 30% annually and has cost the providers more than 3 billion dollars per in the 1997–98 timeframe. The generally accepted industry average acquisition cost for acquiring new subscribers is $400 and it takes carriers eight to nine months to make back those expenses (the average cellular phone bill was $47.70 in 1996). It is clear, that in terms of value per dollar spent, holding on to existing customers is more efficient than replacing them. Unfortunately, the first indication that mobile service providers get relating to the loss of a valued customer is when the customer calls to cancel service.

The causes of churn include; the opportunity to pay a lower rate, the chance to get something for free (e.g. free voice mail or a rebate), and service dissatisfaction. While it is important to understand the causes of churning, from a business standpoint, understanding which particular customers are most likely to churn is even more important. For example, subscribers with high monthly usage are much more likely to churn than subscribers who use their phones sparingly. Not coincidentally, it is the high usage customer who is the most valuable to the mobile service providers.

Many mobile service providers have established customer retention programs to retain their most valuable paying (MVP) customers. These programs utilize demographic and billing information (e.g. types of calls made (domestic vs. International), usage, type of service (high end vs. low end) and length of time as a customer) to identify those MVP customers most susceptible to churning. Customer service representatives contact these at risk customers and offer them incentives in exchange for their loyalty (e.g. a contract with a longer term). These programs have met with considerable success but they place considerable overhead onto the mobile service providers.

Access to the subscribers is another problem associated with these customer retention programs. Customers are reluctant to listen to unsolicited calls from customer service representatives and quite often customer contact is lost before the representatives can get their message across. The success of these programs is dependent on the ability to keep the customer's attention long enough to get the message across.

There is, therefore, a need for a method and system which will allow mobile service providers to gain access to their at risk MVP customers and reduce their susceptibility to churning.

SUMMARY OF THE INVENTION

The present invention has been made in consideration of the above described problems and needs and has particular application to a system which allows mobile service providers to identify and retain at risk subscribers using two-way interactive communication devices capable of communicating with a server device over a wireless data network.

The present invention provides subscriber loyalty and retention techniques. These techniques allows mobile subscribers who have been identified as being likely candidates for churning, to efficiently, visually and interactively, review an offer for a mobile service plan better meeting the subscriber's needs. The subscriber can review and execute the offer using the display and interface of a mobile device. These techniques are suitable for mobile devices with small screens and limited keypad communication.

According to one aspect of the present invention, the present invention discloses a method and system for making incentive offers to retain identified subscribers who may fit a profile of a subscriber susceptible to churning by a competing service provider. Susceptible subscribers are identified when their billing records and/or demographic information match a predetermined profile. For example, when a subscriber's billing records indicates that 100 hours of air time has been used in less than a year then that subscriber could be designated as being at risk for churning. The at risk subscriber is identified and then flagged for preemptive action (e.g. offering the subscriber a better deal before a competitor probably does).

Once a subscriber has been identified as being at risk for churning, a Loyalty Service Server application generates a customized message to the subscriber's mobile device that offers incentives in exchange for agreeing to a contract with a longer term. This notification would appear as a customer service message from the Service Provider and is placed in the mobile device's inbox which can be accessed by the subscriber at any time from anywhere. Thereafter, when the customer service message is selected, it executes an underlying Uniform Resource Identifier (URI) that takes the subscriber to an on-line customer service application (i.e. a Loyalty Service Server application running on a customer service server). This application provides the subscriber with information relating to the terms and benefits of the service provider's offer. Additionally, this system provides a means for the customer to complete the application on-line.

According to another aspect of the present invention, the entire offer and acceptance process (for the new subscriber service plan) is conducted on-line with the subscriber using the input interface of a mobile device to interact with the server hosting the offer. Upon completion of the interaction, the subscriber's service can also be provisioned almost immediately based on the subscriber's acceptance of the offer for a new subscriber service plan.

According to still another aspect of the present invention, the offer for a new subscriber service plan can be electronically sent (e.g. facsimile or email) or mailed to a designated address (i.e., phone number, email address, home address) at the request of the subscriber.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1:
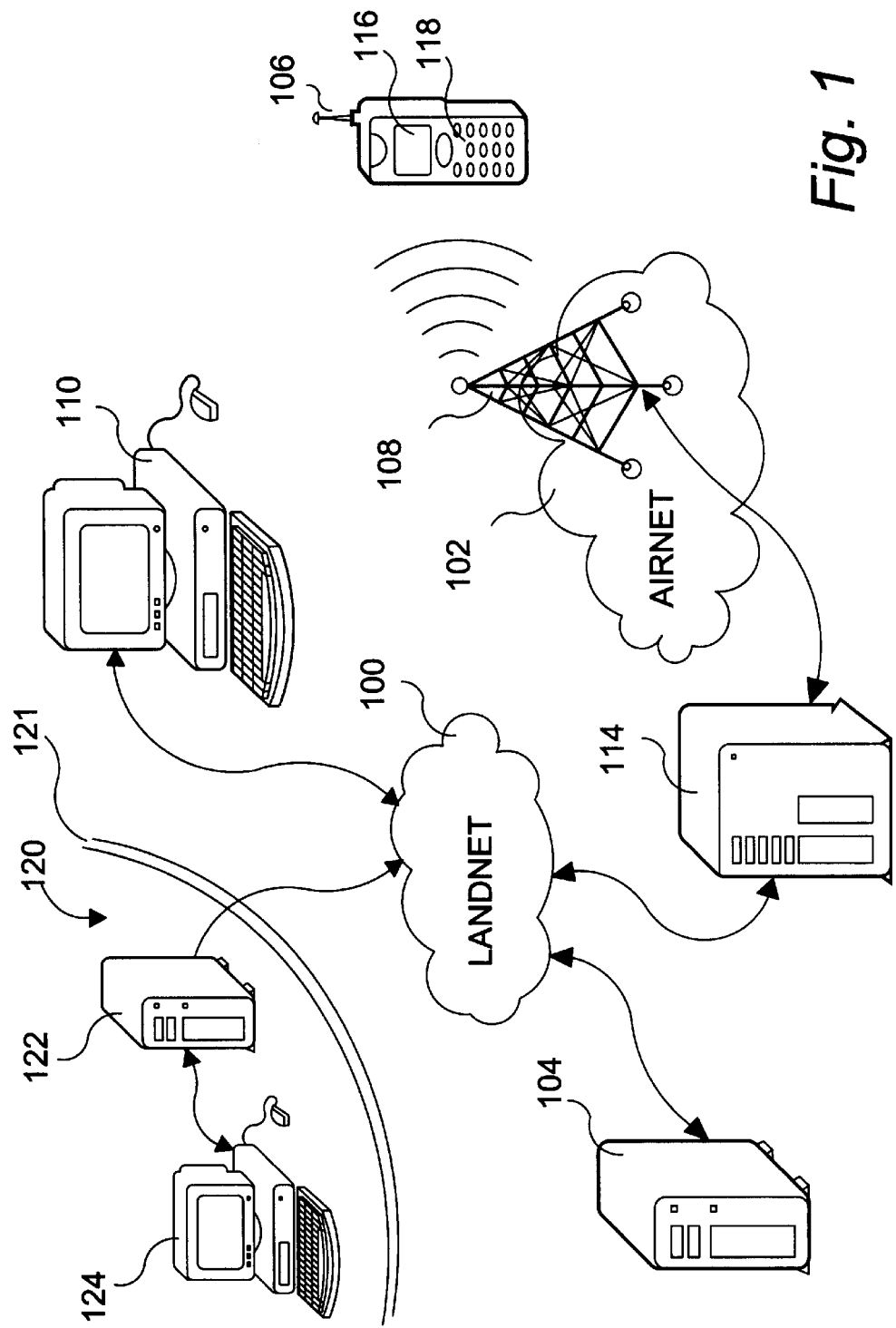
FIG. 1 illustrates a schematic configuration in which the present invention may be practiced.

In the following detailed description of the present invention, numerous specific details are set forth in order to provide a thorough understanding of the present invention. However, it will become obvious to those skilled in the art that the present invention may be practiced without these specific details. In other instances, well known methods, procedures, components, and circuitry have not been described in detail to avoid unnecessarily obscuring aspects of the present invention.

The detailed description of the present invention in the following are presented largely in terms of procedures, steps, logic blocks, processing, and other symbolic representations that resemble of data processing devices coupled to networks. These process descriptions and representations are the means used by those experienced or skilled in the art to most effectively convey the substance of their work to others skilled in the art.

The present invention is a method and system which allows mobile service providers to identify subscribers (particularly those subscribers who are considered to be their most valuable paying (MVP) customers) who may be at risk to churning, and once identified, present those identified with an opportunity to review and execute an upgraded service plan better suited to their needs.

The present invention is well suited for two-way interactive devices that are used with a wireless data network. The two-way interactive communication devices, referred to as mobile or client devices, include but are not limited to personal digital assistant (PDA) like portable devices, cellular phones, or wireless capable remote controllers. Often the two-way interactive communication devices have much less computing resources than a desktop computer or laptop computer does, and such mobile devices tend to have a small display screen and a phone keypad for a user to interact with the server device to access mobile subscriber services.

The method along with the system to be described in detail below is a self-consistent sequence of processes or operations leading to a desired result. These processes or operations are those requiring physical manipulations of physical quantities. Usually, though not necessarily, these quantities may take the form of electrical signals capable of being stored, transferred, combined, compared, displayed and otherwise manipulated in a computer system or electronic computing devices. It proves convenient at times, principally for reasons of common usage, to refer to these signals as bits, values, elements, symbols, operations, messages, terms, numbers, or the like. It should be borne in mind that all of these similar terms are to be associated with the appropriate physical quantities and are merely convenient labels applied to these quantities. Unless specifically stated otherwise as apparent from the following description, it is appreciated that throughout the present invention, discussions utilizing terms such as "processing" or "computing" or "verifying" or "displaying" or the like, refer to the actions and processes of a computing device that manipulates and transforms data represented as physical quantities within the computing device's registers and memories into other data similarly represented as physical quantities within the computing device or other electronic devices.

FIG. 1 illustrates a schematic configuration in of a data communication system which the present invention may be practiced. Landnet 100 is a landline network that may be the Internet, an intranet or a data network of other private networks. Coupled to landnet 100 are a personal computer (PC) 110 and a customer service server 104. Personal computer 110 may be a desktop computer (e.g., an IBM compatible computer) and run a HyperText Markup Language (HTML) browser(e.g., Netscape Navigator from Netscape Communications Corporation) via landnet 100 using HyperText Transfer Protocol (HTTP) to access information stored in customer service server 104 (e.g., a workstation from SUN Microsystems Inc. The information stored in customer service server 104 may be hypermedia information or mobile data including user account information and customer profiles for all user accounts serviced by a carrier. Additionally, customer service server 104 may contain applications, which may allow the generation of customized customer offer messages or letters and process on-line applications for extended or additional subscriber services.

FIG. 1 also illustrates a private network 120 including a computer 124 and a server 122. The private network 120 is protected by a firewall 121 protecting resources of the private network 120 from users on other networks. Private network 120 is typically used in a corporate configuration in which secure information (e.g. billing records) is kept in server 122 and accessible only by computing devices, such as computer 124, on the private network 120. Server 122 may operate as a source of the information stored in customer service server 104. Optionally, although not shown, customer service server 104 may also be protected by a firewall.

Serviced by airnet 102 are a plurality of two-way wireless interactive communication devices, referred to as mobile devices herein, though only one representation 106 is shown in the FIG. 1. Mobile device 106 is one of those two-way interactive communication devices and is capable of communicating, via airnet 102, wirelessly with antenna 108. The airnet 102 represents a wireless carrier infrastructure that generally comprises a base station and an operations and maintenance center. The base station controls radio or telecommunication links with the mobile devices. The operations and maintenance center comprises a mobile switching center performing the switching of calls between the mobile devices and other fixed or mobile network users. Further the operations and maintenance center manages mobile services, such as authentication and oversees the proper operation and setup of the wireless network as well.

Between landnet 100 and airnet 102 there is a server device that operates as a proxy server 114 (also referred to as link server, wireless data server or network gateway server). The proxy server 114 may be a workstation or a personal computer. Proxy server 114 couples airnet 102 to landnet 100. Typically, the communication protocol in airnet 102 is different from that in landnet 100. Hence, one of the functions proxy server 114 performs is to map or translate from one communication protocol to another, thereby enabling mobile device 106 coupled to airnet 102 can communicate with any of the devices coupled to landnet 100 via proxy server 114.

According to one embodiment, the communication protocol in landnet 100 is the well known HyperText Transfer Protocol (HTTP) or HTTPS, a secure version of HTTP, and runs on TCP (Transmission Control Protocol) and, for example, controls the connection of the HTML web browser in PC 110, to customer service server 104, and the exchange of information therebetween. The communication protocol between mobile device 106 and proxy server 114 via airnet 102 is Handheld Device Transport Protocol (HDTP) (formerly known as Secure Uplink Gateway Protocol (SUGP)), which preferably runs on User Datagram Protocol (UDP) and controls the connection of an HDML web browser in mobile device 106, to proxy server 114, where HDML stands for Handheld Device Markup Language. HDML, similar to that of HTML, is a markup language (or tag based document language) and comprises a set of commands or statements specified in a card that specifies how information displayed on a small screen 116 of the mobile device 106. Normally a number of cards are grouped into a deck that is the smallest unit of HDML information that can be exchanged between the mobile device 106 and proxy server 114. The specifications of HDTP, entitled "HDTP Specification" and HDML, entitled "HDML 2.0 Language Reference" are enclosed and incorporated herein by reference in their entirety. These are presented for purposes of illustration and not limitation. One skilled in the art will appreciate that the present invention can be practiced using other communications protocols (e.g. Wireless Session Protocol (WSP)) and markup languages (e.g. Hypertext Markup Language (HTML), Compact Hypertext Markup Language (cHTML), Extensible Markup Language (XML) and Wireless Markup Language (WML)).

It should be noted that HDTP is a session-level protocol that resembles HTTP but without incurring the overhead thereof and is highly optimized for use in thin devices, such as the mobile devices, that have significantly less computing power and memory than that in a desktop personal computer. Further it is understood to those skilled in the art that the UDP does not require a connection to be established between a client and a server before information can be exchanged, which eliminates the need of exchanging a large number of packets during a session creation between a client and a server. Exchanging a very small number of packets during a transaction is one of the desired features for a mobile device with very limited computing power and memory to effectively interact with a landline device.

Although the data communication system 100 was described above as including a proxy server, it should be understood that the data communication system 100 shown in FIG. 1 does not need to include the proxy server 114 as its operations can be performed by any remote server, such as the customer service server 104. The use of the proxy server 114 does provide for efficient mapping or translation between protocols. The data communication system also does not need to use HDML or UDP protocols.

According to one embodiment, mobile phone 106 comprises a display screen 116 and a keypad 118, which allows a user thereof to communicate interactively with mobile device 106. Phone keypad 118 comprises, preferably, a typical phone keypad and a pair of generic buttons and at least a pair of upward and downward arrow buttons. The typical phone keypad, as commonly seen, comprises twelve buttons. Of the twelve buttons, ten buttons are consecutively numbered, each for one of the numerals 0 to 9, respectively, one button is for "*" sign and the other button is for "#" sign. The generic and the arrow buttons provide convenient and efficient means for a user to interact with mobile device 106. Further it is to be understood by those of ordinary skill in the art that the present invention may be practiced using other input interfaces such as touch screens with icons or displayed soft keys.

The mobile device 106 includes a working memory (e.g., ROM and RAM) not shown, in mobile device 106 Compiled and linked processes of the present invention are typically stored in the working memory as a client module that causes mobile device 106 to operate with proxy server 114. Upon activation of a predetermined key sequence utilizing keypad 118, for example, a microcontroller in mobile device 106 initiates a communication session request to proxy server 114 using the client module in the working memory. Upon establishing the communication session, mobile device 106 typically receives a single HDML deck from proxy server 114 and stores the deck as cached in the working memory. As described above, an HDML deck comprises one or more cards and each card includes the information required to generate a screen display on display screen 116. The number of cards in a card deck is selected to facilitate efficient use of the resources in mobile device 106 and in airnet network 102.

As used herein, a display screen is the physical display apparatus in a device, such as a 4-line by 20-character LCD screen. A screen display is the image presented on the display screen such that a screen display can be displayed on a display screen. Further it is understood that a display screen having display lines is only for illustrative purpose and many display screens in reality are graphics-based and do not necessarily have distinct display lines and it will be appreciated that the principles of this invention are equally applied thereto.

Figure 2A:
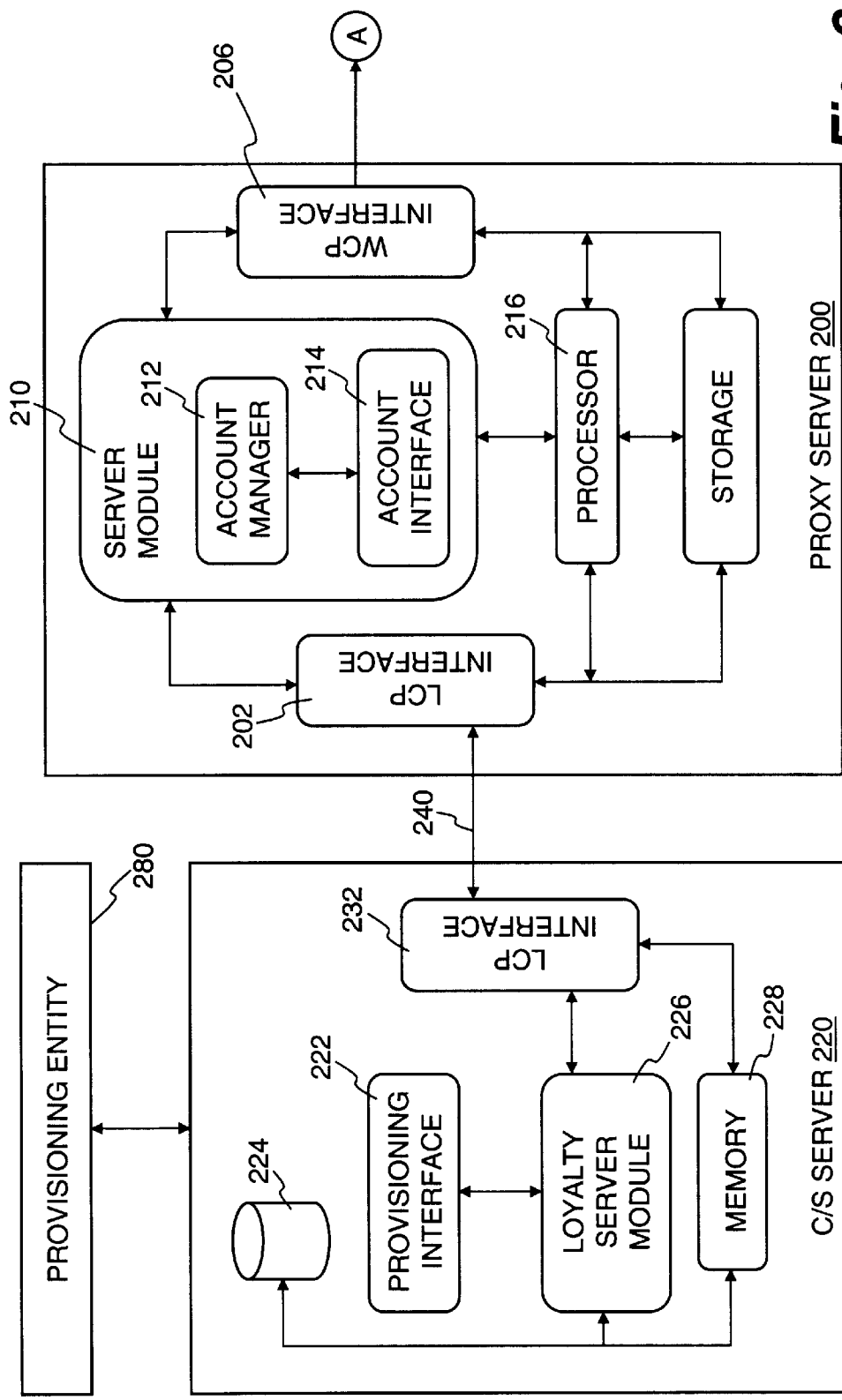
FIGS. 2A and 2B illustrate functional block diagrams of a customer service server, a proxy server and a mobile device according to an embodiment of the present invention.
Figure 2B:
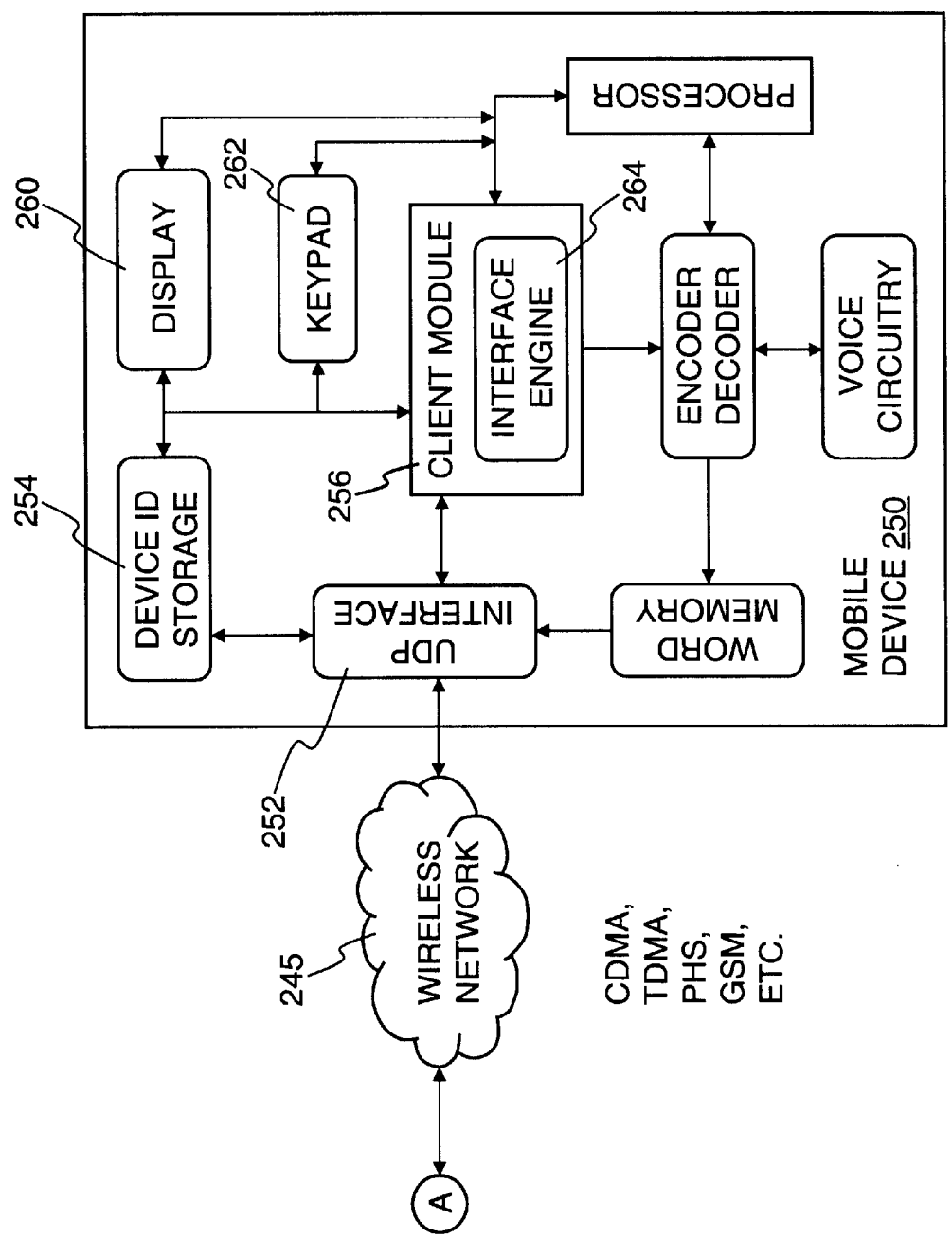

Referring now to FIGS. 2A and 2B, there are shown functional block diagrams of proxy server 200, customer service server 220 and mobile device 250 according to an embodiment of the present invention. Proxy server 200, that may represent proxy server 114 of FIG. 1, is typically a server computer, and mobile device 250 may, for example, correspond to mobile phone 106 of FIG. 1. To avoid obscuring the principle aspects of the present invention, well known methods, procedures, components and circuitry in proxy server 200, customer service server 220 and mobile device 250 are not described in detail. Further, it is understood to those skilled in the art that a server device used herein, which may perform as proxy server 200 or web servers (including customer service server 220), means a piece of hardware equipment that comprises one or more microprocessors, working memory, buses and necessary interfaces and other components while a server module therein means compiled and linked that perform designated functions through the parts and components in the server device. The same distinction is equally applicable to mobile device 106, referred to, for example, as a client device, and the client module as stated above.

Proxy server 200 comprises a landnet communication protocol (LCP) interface 202 that couples to landnet 240, a wireless communication protocol (WCP) interface 206 that couples to a wireless network 245 via a carrier's infrastructure. LCP interface 202 implements a communication protocol operating in landnet 240. If landnet 240 operates HTTP/TCP, LCP interface 202 is typically an HTTP/TCP interface. Similarly, wireless network 250 may operate a wireless communication protocol suitable for the characteristics of a wireless network. For example, if the wireless network operates HDTP/UDP, WCP interface 206 is typically an HDTP/UDP interface. Examples of the wireless communication protocols may include, but be not limited to, wireless session protocol (reference to www.wapforum.org), HTTP or modified HTTP specific for wireless networks. Examples of the wireless network may include Cellular Digital Packet Data (CDPD), Global System for Mobile Communications (GSM), Code Division Multiple Access (CDMA) and Time Division Multiple Access (TDMA) to name a few.

Proxy server module 210 performs traditional server processing as well as protocol conversion processing from one communication protocol to another communication protocol if the communication protocols in landnet 240 and wireless network 245 are different. According to the present embodiment, the protocol conversion processing, sometimes implemented in a separate module referred to as a mapper herein, includes protocol conversion between HTTP/TCP and HDTP/UDP,.

Working with server module 210, account manager 212 manages a plurality of user accounts for all the mobile devices serviced by proxy server 200. It is understood that the user accounts may be stored in another network server coupled to landnet 240. In other words, the user accounts can be kept in a database that is physically placed in any computing device coupled to landnet 240 and can be collected or fetched therefrom. Each of user accounts is associated with one of the mobile devices. Typically a mobile device is assigned an identifier or device ID. Device ID can be a phone number of the device or a combination of an IP address and a port number, for example: 204.163.165.132:01905 where 204.163.165.132 is the IP address and 01905 is the port number. The device ID is further associated with a subscriber ID created and authorized by a carrier as part of the procedures to activate a user account for mobile device 250. The subscriber ID may take the form of, for example, 861234567-10900_pn.mobile.att.net by AT&T Wireless Service, it is nevertheless a unique identification to mobile device 250. In other words, each of mobile devices serviced by proxy server 200 has a unique device ID that corresponds to a respective user account in proxy server 200. The following description is focused on mobile device 250 and its associated account, it shall be appreciated by those skilled in the art that the description is equally applied to all mobile devices in communication with proxy server 200.

Figure 3:
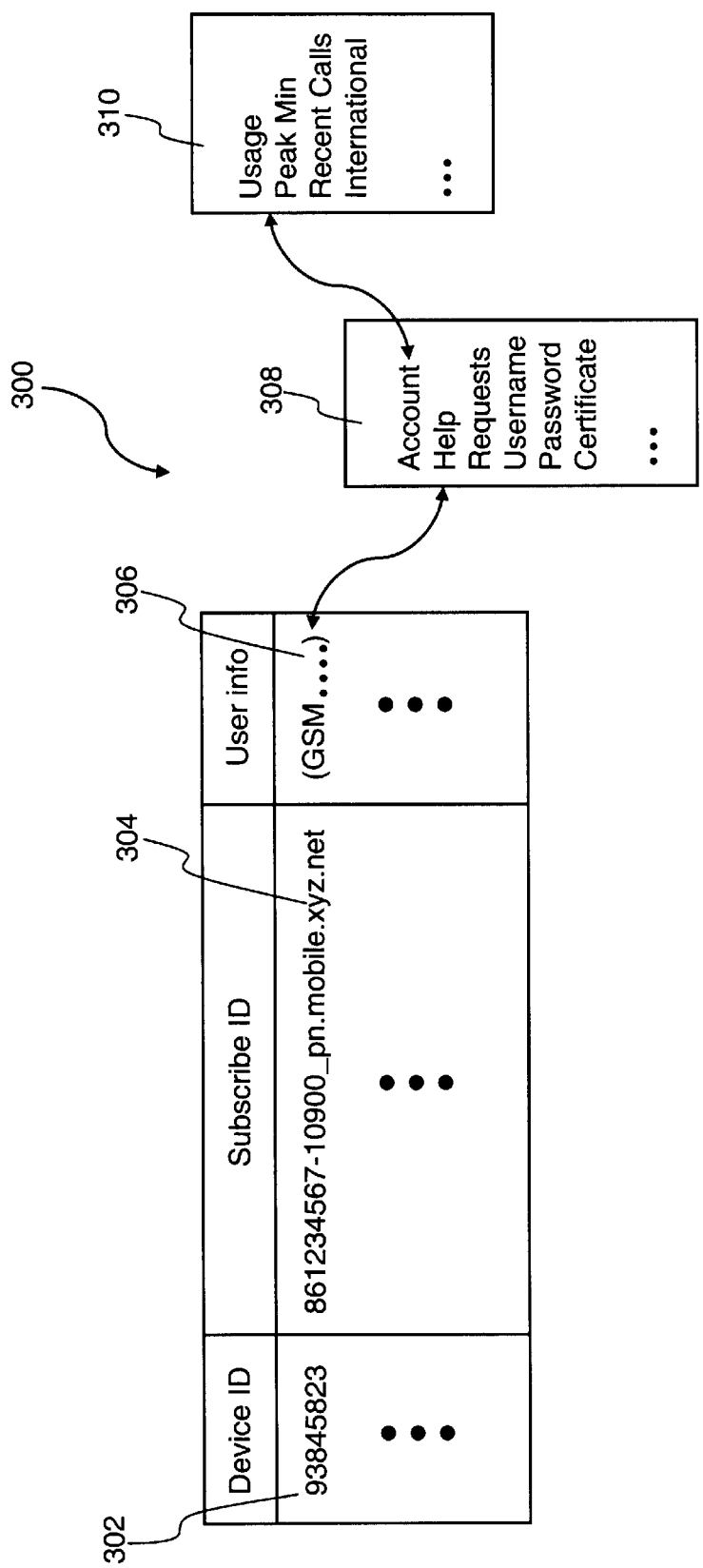
FIG. 3 depicts an account structure used in the description of the present invention.

Subscribers or user accounts, indexed by each respective device ID, may be represented by a data structure 300 as shown in FIG. 3. Each record in data structure 300 comprises information about a subscriber, such as device ID 302, subscriber ID 304 and user information 306 for the account indexed by 93845823. User information 306 may include the account configuration information, for example, device ID 302 is a mobile phone that is pre-configured for a GSM network and, probably, may be provided with an option to switch to a CDPD network if necessary. Further user information 306 may include pointers or linkages to other account related information, such as account index information 308 and further detailed account information 310 such as usage information, peak minutes, and recent call history. Account index information 308 along with all detailed information like account information 310 can be physically located together with data structure 300 or separately in one or more devices coupled to landnet 240 of FIG. 2A. When a request is made from mobile device 250 to retrieve specific information in a server on landnet 240 or a notification received to be delivered to mobile device 250, either the device ID or the subscriber ID 304 thereof must be included for authentication.

Returning to FIGS. 2A and 2B, customer service server 220 is a server device performing customer service related applications and comprises a provisioning interface 222, a storage device 224, loyalty server module 226 and memory 228. Provisioning interface 222 provides access by a provision entity 280 to customer service server 220. In one embodiment, provision entity 280 is a server, corresponding to private server 122 of FIG. 1, within a carrier's private network and stores source information regarding all customer retention programs. The source information is securely forwarded to customer service server 220 that subsequently generates customized offers to respective subscribers with respect to profile information of each of the subscribers. In another embodiment, provision entity 280 is a terminal that is securely connected to customer service server 220. When provision entity 280 is authenticated and provided secure access to customer service server 220 that may include user profile information, special offers and other programs related to the customer retention programs, an authorized user of provision entity 280 may, for example, update the user profile information upon a special request and modify special offers for a particular group of subscribers.

Storage device 224 comprises a plurality of sets of subscriber profile information relating to the churn susceptibility of the subscribers. Additionally, storage device 224 may contain a group of threshold values with respect to the stored profile information. The information contained in storage device 224 may be updated or modified from provisioning entity 280 (e.g. a mobile service providers billing server) through provisioning interface 222. It should be pointed out that the contents in actual customer profiles or formats thereof do not affect the operations of the present invention.

Loyalty server module 226 and program code stored in memory 228 are the primary components making up the subscriber loyalty application running on customer service server 220. The subscriber loyalty application identifies a subscriber who may be susceptible to churning, and once the susceptible subscriber is identified, loyalty server module 226 generates a customized customer retention offer to the susceptible subscriber. The susceptible subscriber is typically identified by comparing stored customer profile information (e.g. billing parameters relating to usage, types of calls, the age of the account, etc.) with a group of predetermined threshold values associated with the profile information. Based on the comparison a churn susceptibility index is generated. A subscriber having profile information (churn susceptibility indexes), which exceeds the threshold values, is identified as being susceptible to churning. The customer retention offer is stored in storage device 224 and a notification thereof is sent through proxy server 200 to a mobile device being used by the susceptible subscriber. The LCP interface 232 in customer service server 220 is compatible to LCP interface 202 in proxy server device 200. If, for example, customer service server 220 and proxy server device 200 are coupled together through the Internet operating HTTP/TCP, both LCP interfaces, 202 and 232, are the HTTP interface modules. If customer service server 220 and proxy server device 200 are connected directly or physically in a same server, both LCP interfaces, 202 and 232, may only need to perform handshaking to ensure proper communication therebetween.

Mobile device 250 includes a corresponding WCP interface 252 that couples to wireless network 245 via a RF transceiver (not shown) to receive incoming and outgoing data signals. It is understandable that WCP interface 252 is implemented with a UDP interface, as does WCP interface 206, when wireless network 245 operates HDTP. When other wireless communication protocol is operated in wireless network 245, both WCP interface 252 and WCP interface 206 are readily implemented accordingly so that proxy server 200 and mobile device 250 can understand and communicate each other.

Device identifier (ID) storage 254 supplies a device ID to UDP interface 252. The device ID identifies a specific code that is associated with mobile device 250 and directly corresponds to the device ID in the user account provided in proxy server device 200. In addition, mobile device 250 includes a client module 256 that performs many of the processing tasks performed by mobile device 250 including establishing a communication session with proxy server device 200, requesting and receiving data from carrier network 208, displaying information on a display screen 260 thereof, and receiving user input from keypad 262 as well. The client module 256 is coupled to UDP interface 252 for the establishment of a communication session and the requesting and receiving of data. Additionally, the client module 256 operates, among other things, a browser 264, commonly referred to as micro-browser, requiring much less computing power and memory than well-known HTML browsers do. The micro-browser is, preferably, a Handheld Device Markup Language (HDML) browser from Unwired Planet, Inc. located at 800 Chesapeake Drive, Redwood City, Calif. 94063. Additional details on accessing a (proxy) server device from a mobile device including a (micro) browser is described in U.S. Pat. No. 5,809,415, which is hereby incorporated by reference in its entirety.

Figure 4:
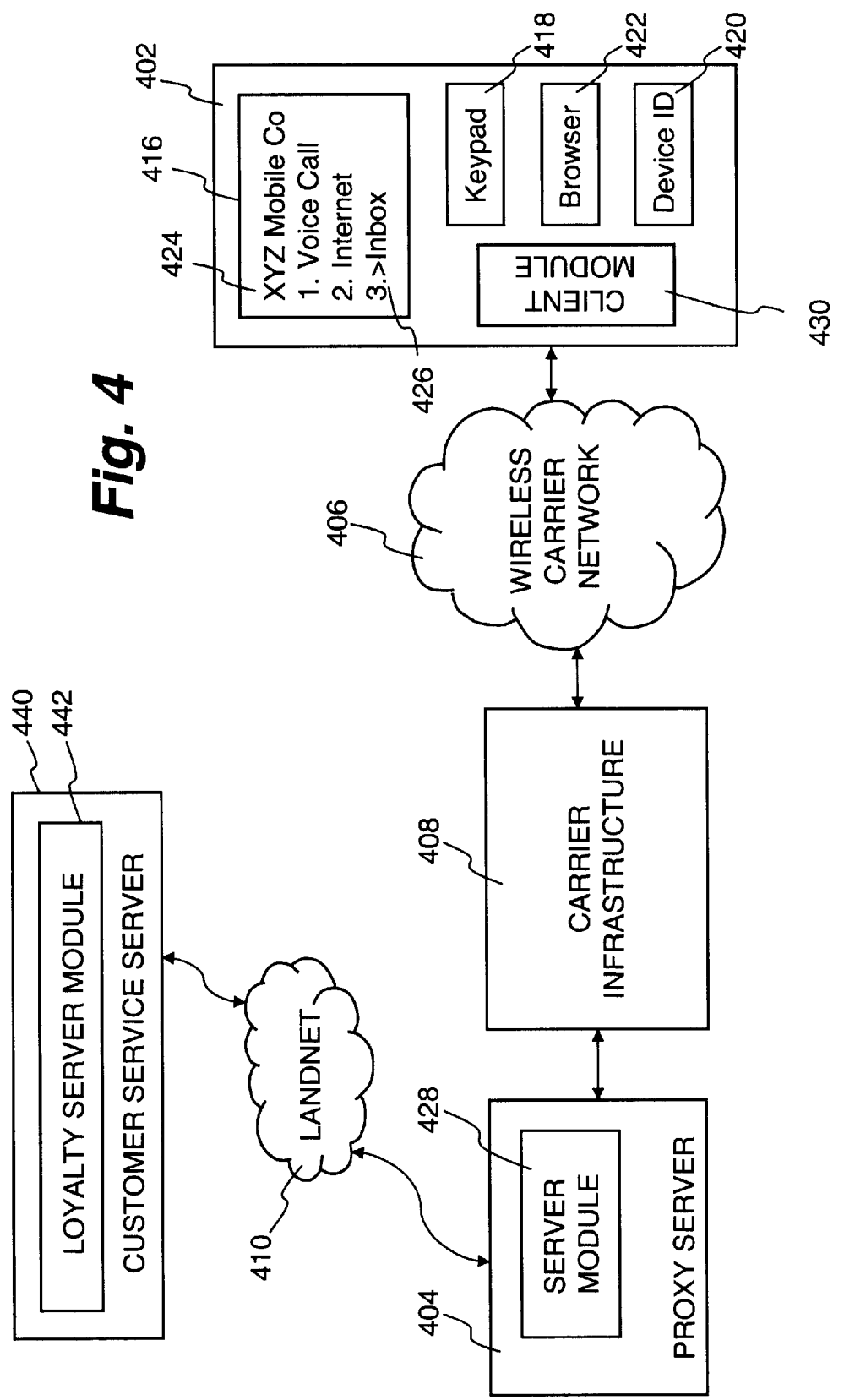
FIG. 4 depicts a system in which a service request for information relating to customer service offers can be practiced according to an embodiment of the present invention.

Referring now to FIG. 4, there is shown an overview of a data communication system 400 according to one embodiment of the present invention. FIG. 4 should be understood in conjunction with FIGS. 2A and 2B. Mobile device 402 is serviced by proxy server device 404 via wireless carrier network 406 and carrier infrastructure 408.

Information is exchanged between mobile device 402 and proxy server 404 upon establishment of a communications session between the two devices. The communications session is conducted using a wireless communications protocol (e.g. Wireless Access Protocol (WAP) or Handheld Device Transport Protocol (HDTP)) and is coordinated by a server module 428 in proxy server 404 and client module 430 in mobile device 402. When the communications session between mobile device 402 and proxy server 428 is established, a request for information contained on a customer service server 440 can be made by the server module 428. The request is forwarded by proxy server 404 to customer service server 440 through LANDNET 410 (e.g. the Internet or an Intranet). Communications between proxy server 404 and customer service server 440 can be conducted utilizing protocols in the Transmission Control Protocol/Internet Protocol (TCP/IP) family (e.g. Hypertext Transport Protocol (HTTPS) over Internet Protocol (TCP/IP) or Secure Hypertext Transport Protocol (HTTPS) over Internet Protocol (TCP/IP)). One of ordinary skill in the art will understand that a single server device may provide the functions of proxy server 404 and customer service server 440.

Loyalty Server Module 442 is an application running on customer service server 440. This application provides the functionality required for receiving, storing and managing customer profile information (e.g. demographic information, billing information and calling tendencies such as the type of calls made) and thresholds related to churn susceptibility. Additionally, Loyalty Server module 442 can further identify those customers (also referred to as users or subscribers) who have been statistically identified as being susceptible to churning, and can automatically generate an offer for a value-added service package to customers so identified.

Similar to mobile device 250 of FIG. 2B, mobile device 402 comprises a display screen 416, a keypad 418 and a working memory 420 that includes a device identification thereof. Preferably, mobile device 402 further comprises an HDML micro-browser 422.

It is now understood that the information of the airtime by a particular mobile device can be collected and updated with respect to the corresponding user account maintained in proxy server device 404. According to the present embodiment, screen display 424 is provided in an HDML choice card, preferably cached in the memory 420 of mobile device 402 when a communication is established with proxy server 404. The choice card comprises a list of choices, each choice corresponding to a selection that may be linked to available services and linked documents. To be more specific, screen display 424 shows in FIG. 4 that there are three choices, Voice Call, Internet and Inbox. It should be noted that the number of the choices being displayed are not necessarily related to the principles of the present invention, they are only for illustrative purposes herein and typically related to actual implementation preference by the carrier. As shown in screen display 424, the Inbox is indicated by a choice or element indicator 426 that can be moved upward and downward by user interaction with keypad 418. If the user selects the third choice, i.e. Inbox, a selection or chosen preference is made after a predefined key is pressed. A client module 430 interprets the chosen preference and then generates a request corresponding to the chosen preference. The request is forwarded to proxy server device 404 over wireless network 406. Typically the request comprises a device ID of mobile device 402, at least one uniform resource identifier (URI) identifying resource information for the Inbox. The resource information may reside in proxy server 404 or customer service server 402.

Upon receiving the request from mobile device 402, server module 428 of proxy server 404 executes the request by accessing the resource information associated with the subscriber identifier. More specifically, the server module authenticates mobile device 402 with respect to the associated user account managed by the account manager and retrieves the resource information identified by the URI.

According to the invention, the resource information may include a customized message to the user of mobile device 402. In one embodiment, the customized message is an offer of services. The offer may be for a value-added service package providing additional services to the user in exchange for an extended services contract with the carrier. This customized message would appear as a Customer Service Message from the service provider and be presented in the subscriber's inbox (see FIG. 6B discussed below. When the Customer Service Message is selected (as described below), it executes an underlying Uniform Resource Identifier, which takes the subscriber, via proxy server 404, to the Loyalty Service Server application running on the customer service server 440. The subscriber is then allowed to review a customized loyalty offer on the screen of mobile device 416. The customized loyalty offer details briefly and explicitly the terms of the offer. Additionally, the subscriber is presented with the option to either review and subscribe to the offer on-line using mobile device 402 or to contact a customer service representative by pressing a predetermined key.

If the subscriber chooses to accept the offer, there will be additional terms and conditions which can be displayed on mobile device 402 or faxed to a conveniently located fax machine. If a signed contract is required to process the service subscription, it is presented to the subscriber as a faxable document, which can be signed and faced back to the service provider. Since the process for executing the offer is an IP type transaction (if that option is selected), and the provisioning information is already known to the service provider—the proxy server 404 can rout the subscription transaction directly into the billing system, which can automatically provision the new service.

It should be noted that the user preferably utilizes a mobile device, such as a cellular telephone, that is capable of communicating over a data capable wireless network. More specifically, a cellular telephone is not a combination of a computer and a wireless communication module as seen in laptop computers. Typically the computing power of a mobile device may be equivalent to less than one percent of what is provided in the laptop computers. The memory capacity of the mobile device is generally less than 128 kilobytes and the LCD display is perhaps a few lines high by twelve or twenty characters and the graphics capabilities is very limited. Further, the input interface is limited to a few keys or displayed soft keys. Nevertheless, these constraints are important to maintain for the usability and mobility of the mobile device. Even still, the invention is not limited to mobile devices having such limiting features but is generally applicable to all mobile devices that make use of subscriber services.

Figure 5A:
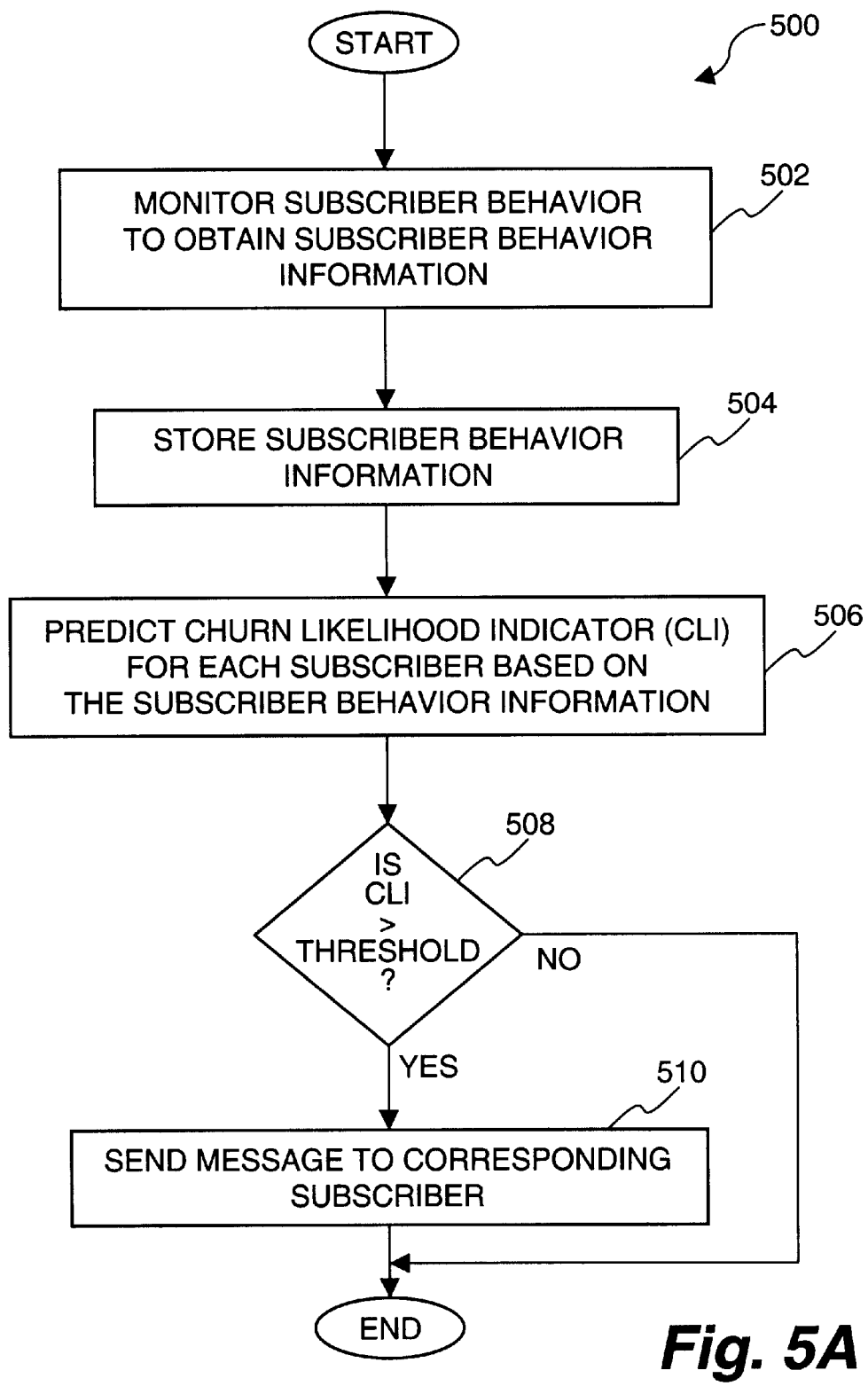
FIG. 5A is a flow diagram of churn reduction processing according to an embodiment of the invention.
Figure 5B:
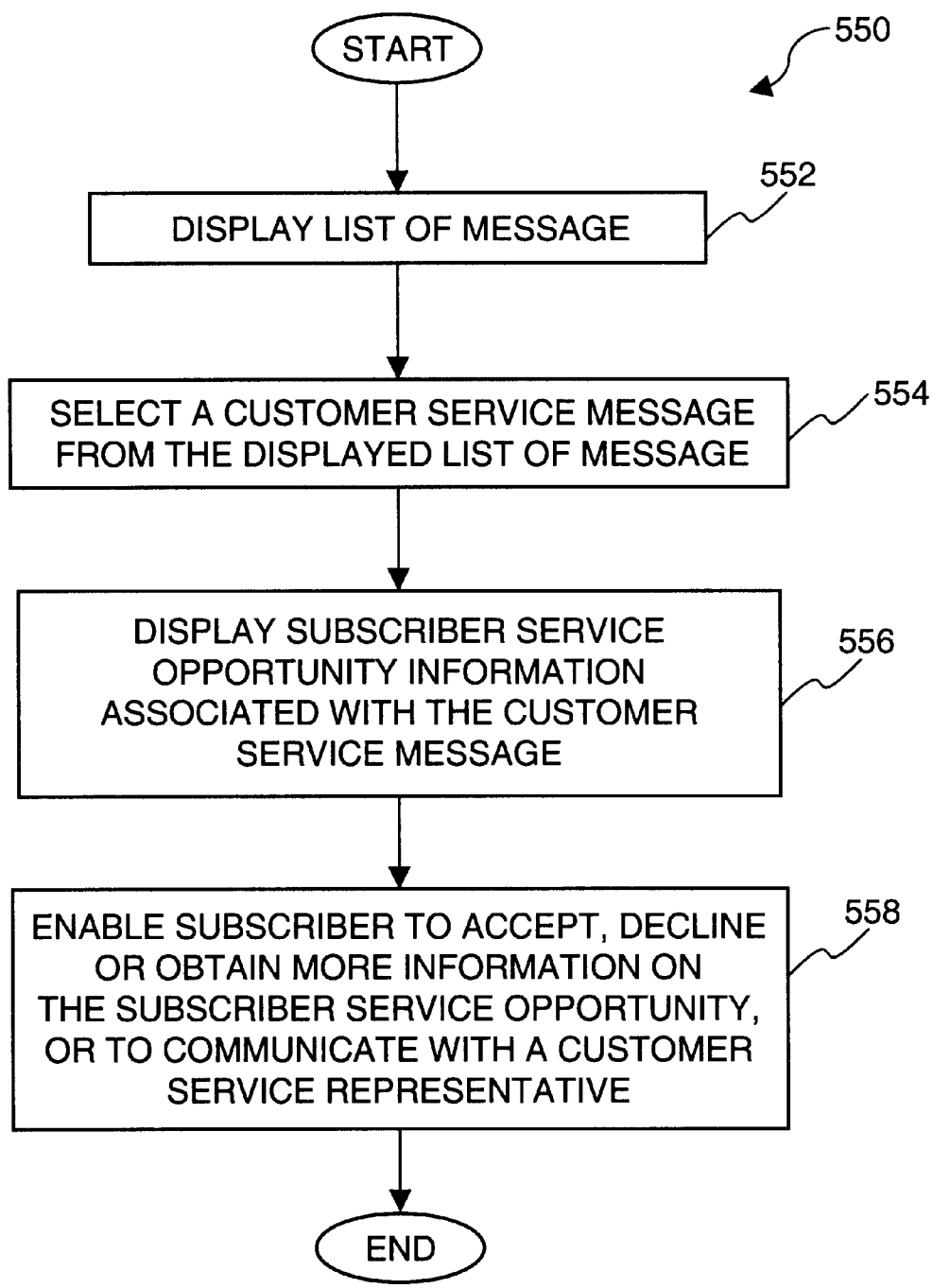
FIG. 5B is a flow diagram of customer service retention processing according to an embodiment of the invention.

FIGS. 5A and 5B are flow diagrams of processing performed by a customer service server and a mobile device, respectively. The processing is designed to reduce the likelihood that subscribers of a carrier's service will churn to another competing carrier.

FIG. 5A is a flow diagram of churn reduction processing 500 according to an embodiment of the invention. The churn reduction processing 500 is, for example, performed by a customer service server, such as the customer service server 104 illustrated in FIG. 1.

The churn reduction processing 500 monitors subscriber behavior to obtain subscriber behavior information at block 502. The subscriber behavior information is then stored on the customer service server or some other storage location accessible by the customer service server at block 504. Next, a churn likelihood predictor (CLI) is predicted 506 (or estimated) for each of a plurality of subscribers. The prediction or estimation of the churn likelihood indicator is performed based on the subscriber behavior information. For example, in one embodiment, the churn likelihood indicator could be determined based on subscriber usage which is a particular subscriber behavior that can be monitored.

Following block 506, the churn likelihood indicator for each subscriber is compared against a threshold value at decision block 508. When the churn likelihood indicator for a particular subscriber exceeds the threshold value, then it is determined that that particular subscriber has a high susceptibility to churning. Hence, for those of the subscribers that are determined to have a high susceptibility to churning, predetermined messages are sent at block 510 to such subscribers. The objective of the messages that are sent to the subscribers is to reduce the likelihood that the subscribers will, in fact, churn in the near future to some other carrier. In one embodiment, the messages can offer the subscribers an improved subscriber service plan that would offer them better rates in exchange for a longer-term commitment. The particular subscriber service plan offered to the subscribers can be selected from a variety of options based on the particulars of the subscriber's behavior. Following block 510, the churn reduction processing 500 is complete and ends. Additionally, when the churn likelihood indicator is determined not to exceed the threshold value at the decision block 508, the churn reduction processing 500 has determined that such subscribers do not have a high susceptibility to churning and, thus, block 510 is skipped for such subscribers so that the messages to reduce their churn likelihood are not send.

FIG. 5B is a flow diagram of customer service retention processing 550 according to an embodiment of the invention. The customer service retention processing 550 is, for example, performed a mobile device, such as the mobile device 106 illustrated in FIG. 1.

The customer service retention processing 550 is, for example, incorporated into other messaging type operations that are performed on a mobile device. Typically, these operations would include the receipt and display of incoming messages (e.g., email messages) into an in-box. Once messages are stored in the inbox, mobile devices are typically able to read, reply and sometimes fax the messages in accordance with a subscriber's desires.

According to the customer service retention processing 550, certain messages may be sent to a subscriber of a mobile device by customer service departments associated with carriers. These customer service messages can pertain to subscriber service opportunities for the subscriber of the mobile device. As discussed above with respect to FIG. 5A, the customer service messages can be automatically generated by a customer service server and forwarded to appropriate subscribers.

In any event, the customer service retention processing 550 displays a list of messages that have been received by a mobile device and are available to be read by a subscriber of the mobile device at block 552. Then, a customer service message is selected from the list of messages at block 554. Here, the subscriber in viewing the list of displayed messages on a display screen of a mobile device, operates to select a customer service message from the list of messages. Hence, the customer service retention processing 550 is essentially activated when the subscriber makes the selection of the customer service message. As previously noted, the customer service message is, for example, the message sent at block 510 of FIG. 5A.

After selecting the customer service message, the subscriber service opportunity information that is associated with the customer service message is displayed on the display screen of the mobile device at block 556. At this point, the subscriber is able to accept, decline or obtain more information on the subscriber service opportunity. Additionally, if desirable, the subscriber can also be able to directly communicate with a customer service representative to discuss details pertaining to the subscriber service opportunity. Following block 558, the customer service retention processing 550 is complete and ends.

According to one embodiment of the present invention, the stored billing records are periodically analyzed to identify selected subscriber usage parameters. These usage parameters are forwarded to the customer service server where they are used in conjunction with service provider preferences (e.g. the service provider may want to devote resources to the most profitable customers) and available demographic information to develop a churn susceptibility index for subscribers in the service providers network. Those customers having a churn susceptibility index meeting predetermined criteria are flagged for inclusion in the service provider's customer retention program (or loyalty assurance program). Once flagged, the customer is sent a customized message that has been generated by the Loyalty Service Server application running on the customer service server (i.e. customer service server 104 in FIG. 1).

Figure 6A:
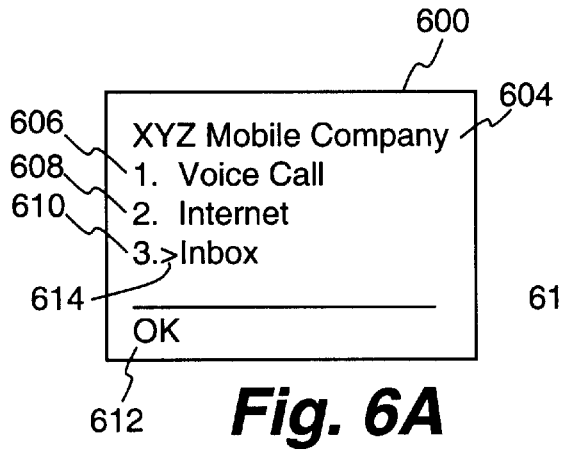
FIGS. 6A to 6L demonstrate an exemplary mobile subscriber visual interface by illustrating a sequence of screen displays according to an embodiment of the present invention.

The user interaction with the mobile device in accordance with the invention will now be further described with reference to FIGS. 6A to 6L. FIGS. 6A and 6L illustrate a exemplary series of screen displays on display screen 600 of a mobile device (106 of FIG. 1) according to one embodiment. When the mobile device is turned on, an initial screen display 604 can be displayed on display screen 600. Referenced by 612 is a soft key generally associated with one of the generic buttons in the keypad of mobile device 106 in FIG. 1. As described above, the soft key provides a mechanism to map a generic button into a specified button, namely to press the generic button is equivalent to pressing an "OK" button when the soft key "OK" is displayed. Again, the functionality of this invention is independent of specific soft keys. Other means may be used to assign the soft key to one of the buttons existing in a standard phone keypad, such as the "#" key.

Screen display 604 may be supplied by one of a plurality of choice cards in a deck cached in the working memory of the mobile device. Screen display 604 contains textual information that indicates information and selectable elements available in the current screen display. Three selectable elements 606, 608 and 610 are provided on screen display 604. Selectable element 610 is shown as being selected as indicated by an element indicator (or element selection character) 614. Any one of the selectable elements 606, 608 and 610 can be preselected.

In this embodiment, a selected element is visually indicated to the user by element indicator 614. Namely, as shown, element indicator 614 is placed after the numeric label "3" indicating that it is the third choice in the menu in screen display 604 for that element. However, any other method, such as inverse image or video, a different element selection character, or the position of the element being always at the top or bottom of the display, could also be used to indicate the specific element selected without having an impact on the operation of this invention. The user can select a different element by vertically scrolling element indicator 614 up or down.

In accordance with the present embodiment, screen display 604 includes three choices. First choice 606 places the mobile device in a voice mode in which a user can dial a phone number to place a phone call. Second choice 608 enables the user to navigate the Internet. Third choice 610 allows the user to view or access their inbox. The inbox contains incoming messages (e.g., email or pages) for the subscriber of the mobile device. Pressing a predetermined key (i.e. the soft key associated with "OK") when element indicator 614 is aligned with the third choice takes the user to a display screen as shown in FIG. 6B.

Figure 6B:
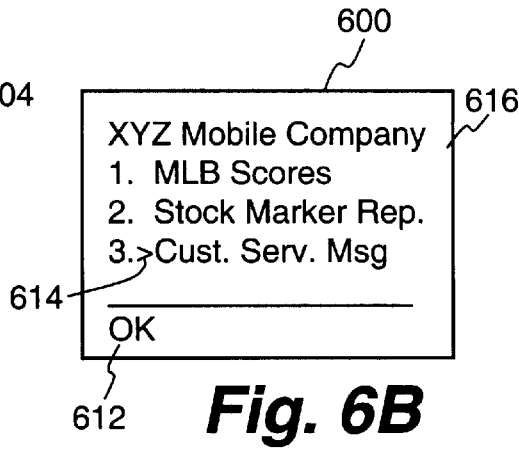
Figure 6C:
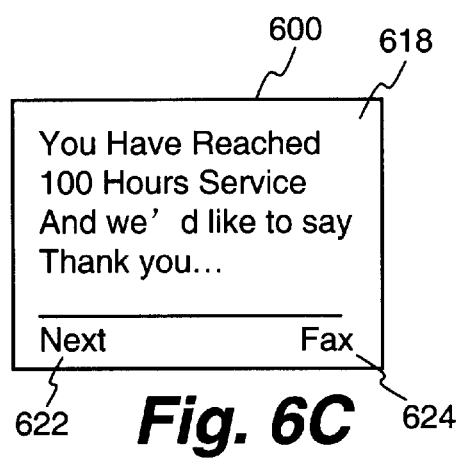

FIG. 6B shows that element indicator 614 has been moved down to the third choice "Cust. Serv. Msg." Generally, upon pressing the predetermined key, the mobile device makes a connection request to a server device that in turn returns the requested information. In this example the requested information is a customer service message from the Loyalty Service Server application running on a server (i.e. customer service server 104 in FIG. 1). The returned information, typically cached first, is then displayed in screen display 618 as shown in FIG. 6C. The associated customer service message from the Loyalty Service Server application is fetched and displayed. As described before, the Loyalty Service Server application is an application running on a customer service server which is connected to a mobile device (402 in FIG. 4). In the case of the customer service message from the Loyalty Service Server application described before, the message (e.g. a loyalty offer to a subscriber identified as being at risk to churning) must be pulled or fetched from the customer service server.

Figure 6D:
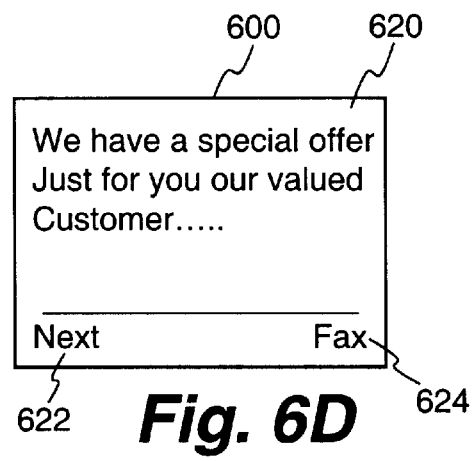

Again referring to FIG. 6C, the customer service message (e.g. "You Have Reached 100 Hours Service and we'd like to say thank you . . . ") is displayed on screen display 618. There are two soft keys 622 and 624. Soft key 622 indicates that display screen 616 has more information to be displayed if soft key 622 is pressed while soft key 624 provides convenient means for the user to fax the customer loyalty offer to a nearby fax machine or to forward it to a specified email address. FIG. 6D displays the remainder of the message from FIG. 6C and gives the user the same soft key options.

Figure 6E:
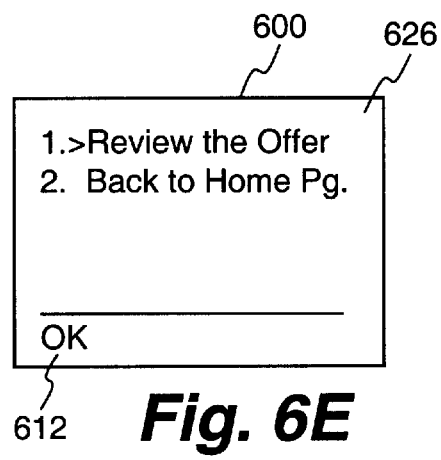
Figure 6F:
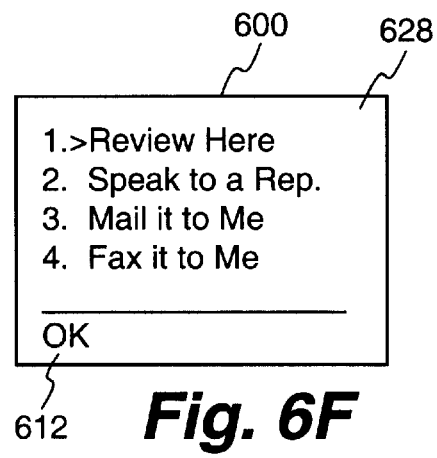

FIG. 6E displays screen display 626, which provides the user with the choice of reviewing the customer loyalty offer ("Review the Offer") or going back to the initial screen display 604 ("Back to Home Pg."). If the subscriber selects the, first option ("Review the Offer") screen display 628 will be displayed as shown in FIG. 6F. In screen display 628 the subscriber is given four options. Option 1 ("Review Here") allows the subscriber to review the customer offer on display 600 of the mobile device. Upon reviewing the customer loyalty offer, the subscriber has the option of executing the offer on-line using the interface of the mobile device. Since the process is conducted on-line, the customer's new service can be provisioned immediately by the service provider providing the service. This is the most cost-effective manner for the service provider since interaction with a customer service representative is not required.

Figures 6G, 6H:
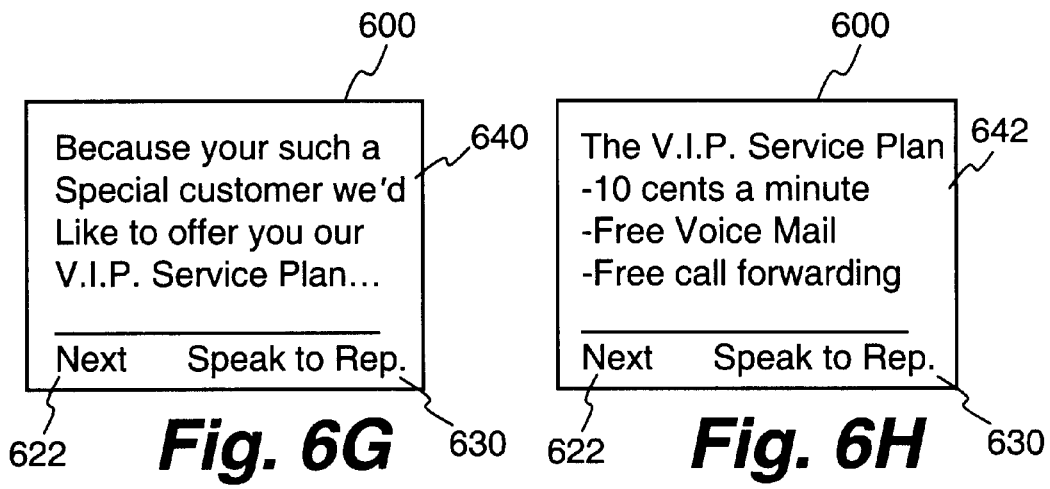
Figures 6I, 6J:
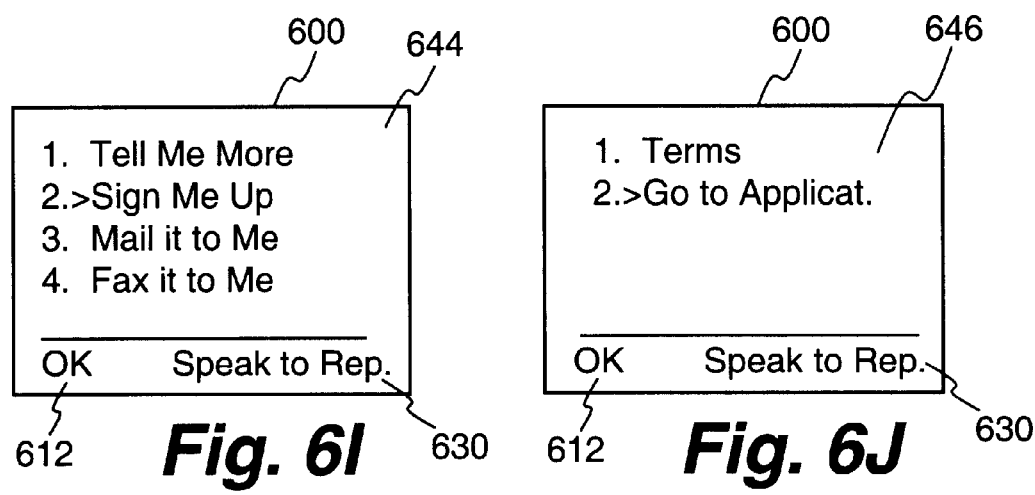
Figures 6K, 6L:
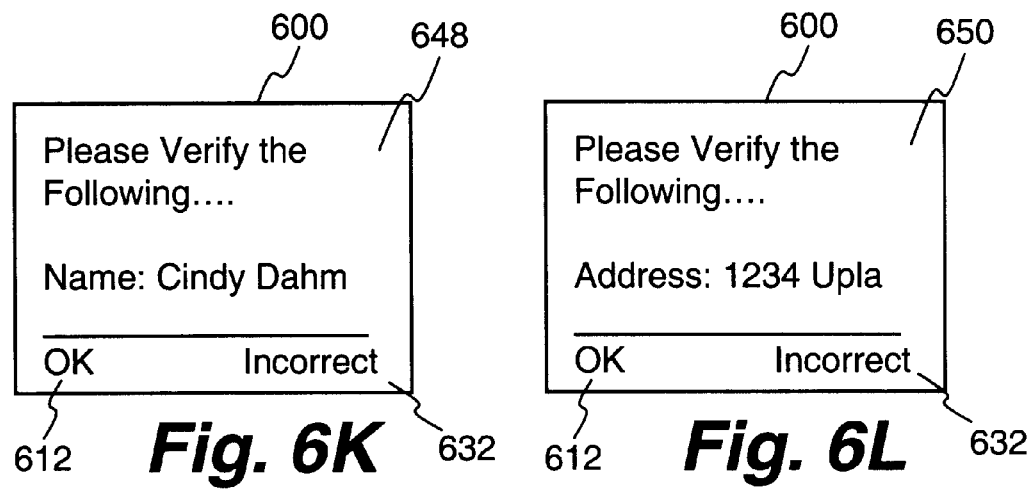

Upon selecting the first option ("Review Here") from screen display 628 the subscriber will be given a brief overview of the loyalty offer and the opportunity to gain more information using the interface of the mobile device as shown in FIGS. 6G and 6H. Screen displays 640 and 642 give the subscriber a brief promotional message and the key features of the loyalty offer. Soft key 622 shown in FIG. 6H leads to screen display 644 shown in FIG. 6I. Soft key 630 provides a convenient means for the subscriber to contact a customer service representative by pressing a single key, an useful feature when a describer desires a "human voice." At this point in the process, the subscriber's attention is focussed on the offer and it is desirable to provide the subscriber with every opportunity to request additional information and execute the offer. To this end, the subscriber is given the opportunity to complete the process using the input interface of a mobile device or contact a customer service representative. Referring to FIG. 6I, screen display 644 gives the subscriber several options. Option 1 ("Tell Me More") provides more details relating to the details and terms of the customer loyalty offer. Option 2 allows the subscriber to execute the customer loyalty offer using the input interface of the mobile device. Options 3 and 4 allow the subscriber to receive the customer loyalty offer by mail or facsimile.

Referring to FIGS. 6J to 6L, a customer selecting option 2 in FIG. 6I is presented with screen display 646, and given the option of reviewing the terms of the agreement (option 1) or proceeding right to the application (option 2). Most of the information required to process the agreement is already known to the service provider. Hence, the subscriber may only need to verify the information and press "OK" if the information is correct or input updated information if it is incorrect as shown on screen displays 648 and 650 as shown in FIGS. 6K and 6L. If need be, the subscriber can add new information if needed.

Figure 7A:
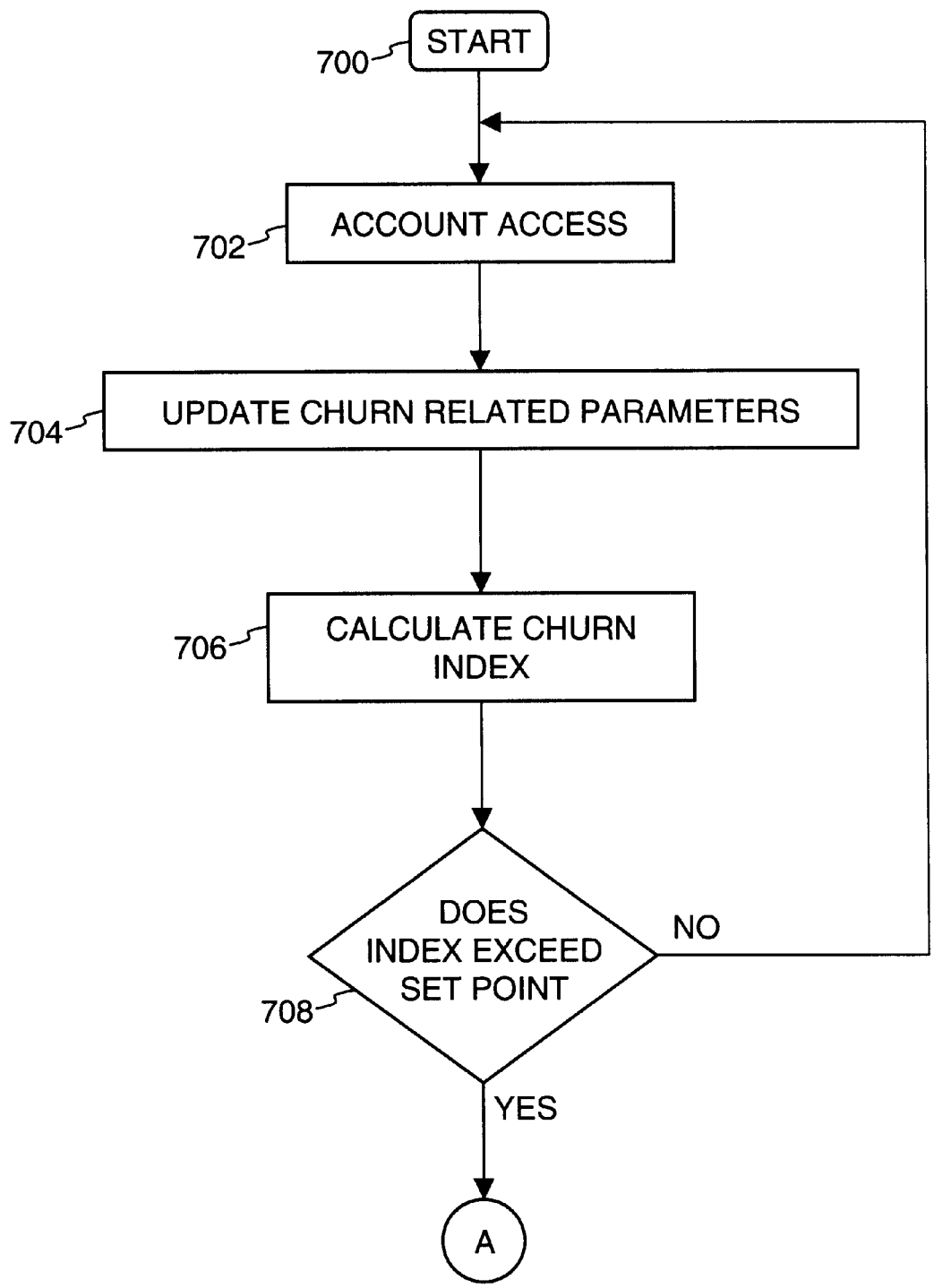
FIGS. 7A and 7B illustrate a process flowchart of the present invention according to one embodiment.
Figure 7B:
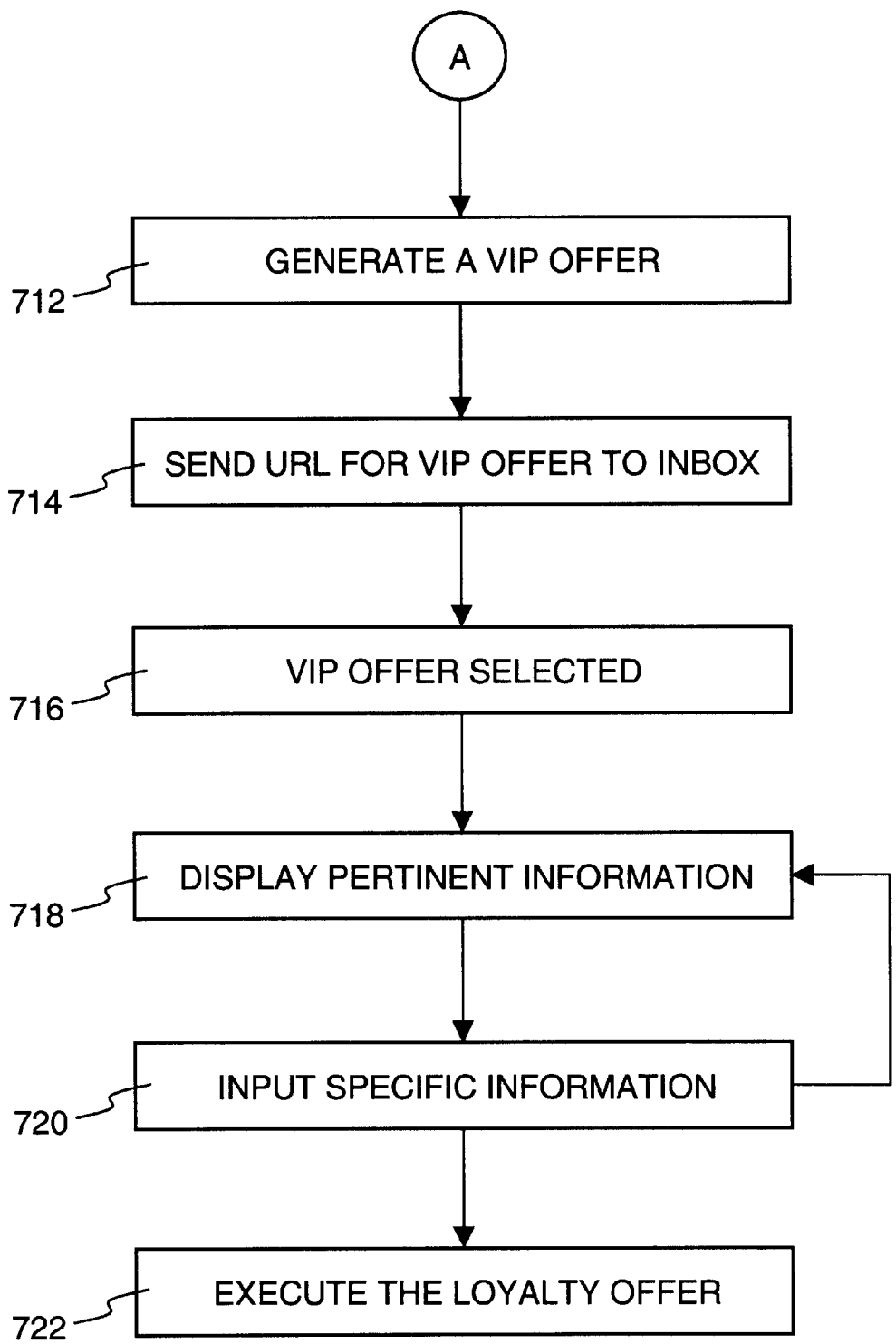

FIGS. 7A and 7B illustrate a process flowchart according to one embodiment of the present invention and shall be understood in conjunction with the rest of the figures. At 700, a mobile device is in a state that displays a menu comprising a link to access mobile subscriber services that may further provide entries or choices to a plurality of aspects of the services including user accounts, help, service requests, etc. At 702, a choice is made by a user to access one particular aspect of the mobile subscriber services, and the choice provides a link to the user account database, which records activities. Upon completion of the subscriber's activities, customer profile information and churn related parameters are updated (704). Following this update a churn index is calculated (706), which provides an indication of a subscriber's susceptibility to churning. At 708 the churn index is compared to predetermined threshold values (e.g. 100 hours usage) and those subscriber's having indexes exceeding the threshold values are flagged as recipients for VIP offers (customer service plans designed to discourage churning). VIP offers are generated for flagged subscribers at 712. A link (e.g., Uniform Resource Locator (URL)) and a brief message relating to the VIP offer are sent to the inbox for the subscriber's mobile device at 714. The link, for example, may be an IP address for the customer service server where the VIP offer is resident.

Upon activating a predefined key on the phone keypad, the mobile device, at 716, makes a request to communicate with a server device (e.g. a customer service server) that is identified by the link (e.g., IP address) and hosts the VIP offer or provides a gateway to the loyalty offer that may be located in another device coupled to the customer service server device via a data network, e.g. the Internet. To prevent possible unauthorized access to the user account with respect to the mobile device at 716, an account manager in the server device, proceeds with an access verification that may include a verification of the request by, for example, comparing the device identification from the mobile device with a corresponding device identification in the user account. If the device identifications are matched, the access is permitted at 716. Further, if necessary, a secure session may be established by exchanging encryption keys from both sides. The detailed description of establishing a secure communication session between the mobile device and the server device is provided in commonly assigned U.S. patent application Ser. No. 08/966,988 entitled "Method and System for Secure Lightweight Transactions in Wireless Data Networks" Hanqing Liao, et al, which is hereby incorporated by reference in its entirety.

At 716, the server device consolidates all available information and options provided by the carrier to this particular user account in a form transportable in the wireless network to the mobile device. The form may be represented in a markup language, such as HDML, supported by a micro-browser in the mobile device. The micro-browser in the mobile device interprets the form and causes the mobile device to display all information and options to the user at 718. With the available services are displayed, the user may perform a number of tasks including viewing the VIP offer, inputting information in accordance with requests displayed on the screen of the mobile device 720 or executing the VIP offer on-line 722.

It can be appreciated by now that the present invention provides an efficient means for mobile service providers to lessen the susceptibility of their subscribers to churning. The present invention allows users to navigate, via a wireless data network, all aspects of a VIP offer on a mobile device with a small screen and a phone keypad without incurring additional costs to the service providers.

The present invention has been described in sufficient detail with a certain degree of particularity. It is understood to those skilled in the art that the present disclosure of embodiments has been made by way of example only and that numerous changes in the arrangement and combination of parts as well as steps may be resorted without departing from the spirit and scope of the invention as claimed. Accordingly, the scope of the present invention is defined by the appended claims rather than the forgoing description of embodiments.

What is claimed is:

1. A method for automatically messaging subscribers, said method comprising:
   monitoring subscriber behavior to acquire and store subscriber behavior information for a plurality of subscribers, each using a mobile device;
   predicting a churn likelihood indicator for each of the subscribers based on the subscriber behavior information corresponding thereto;
   comparing the churn likelihood indicator with a predetermined threshold to produce a comparison result for each of the subscribers; and
   automatically sending an electric message to the mobile device corresponding to a subscriber being one of the subscribers when the subscriber is susceptible to churning based on the comparison result, the electronic message being automatically sent including an offer to a subscriber service opportunity that is being made available to the subscriber, wherein the electronic message is displayable on a display screen of the mobile device direct.

2. A method as recited in claim 1, wherein further comprises:
   the electronic message is in a markup language.

3. A method as recited in claim 1, wherein the offer includes a list of selectable items, each identified by a link; and said method further comprises:
   receiving a message from the mobile device when one of the selectable items is selected, wherein the message includes the link identifying the one of the selectable items.

4. A method as recited in claim 3, wherein said method further comprises:

provideing, according to the link, access to the one of the selectable items selected by the one of the subscribers.

5. A method as recited in claim 1, wherein the subscribers are subscribers to wireless data communication services.

6. A method for automatically messaging subscribers, said method comprising:

receiving a customer service message at a mobile device of a subscriber, the customer service message including a list of selectable service opportunities, and the customer service message being automatically generated and forwarded to the mobile device by a service provider to the mobile device for the subscriber based on a likelihood that the subscriber will churn;

notifying the subscriber of the customer service message;

displaying the list of selectable service opportunities on a display screen of the mobile device when the subscriber responds to the customer service message; and sending to the service provider a message identifying one of the selectable service opportunities when the one of the selectable service opportunities is accepted by the subscriber.

7. A method as recited in claim 6, wherein the customer service message is in a mark-up language and the link is a URL.

8. A method as recited in claim 6, wherein the subscribers are subscribers to wireless data communication services.

9. A computer readable medium including computer program code for automatically messaging subscribers, said computer readable medium comprising:

computer program code for monitoring subscriber behavior to acquire and store subscriber behavior information for a plurality of subscribers, each using a mobile device;

computer program code for predicting a churn likelihood indicator for each of the subscribers based on the subscriber behavior information corresponding thereto;

computer program code for comparing the churn likelihood indicator with a predetermined threshold to produce a comparison result for each of the subscribers; and computer program code for automatically sending an electronic message to the mobile device corresponding to one of the subscribers when the subscriber is susceptible to churning based on the comparison result, the electronic message being automatically sent including an offer to a subscriber service opportunity, wherein the electronic message is displayable on a display screen of the mobile device.

10. The computer readable medium as recited in claim 9, wherein the electronic message is in a form of markup language.

11. The computer readable medium as recited in claim 9, wherein the offer includes a list of selectable items, each identified by a link; and the computer readable medium further comprises:

computer program code for receiving a message from the mobile device when one of the selectable items is selected, wherein the message includes the link identifying the one of the selectable items.

12. The computer readable medium as recited in claim 11, the computer readable medium further comprising:

computer program code for providing, based on the link, access to the one of the selectable items selected by the one of the subscribers.

13. The computer readable medium as recited in claim 12, wherein the one of the selectable items is offered to the one of the subscribers in exchange for agreeing to a contract with a longer term.

14. The computer readable medium as recited in claim 9, wherein the electronic message is sent through a Short Message Service (SMS).

* * * * *